United States Patent
Weinhardt et al.

(10) Patent No.: US 10,035,295 B2
(45) Date of Patent: Jul. 31, 2018

(54) PLASTIC TUBE BENDING METHOD AND APPARATUS

(71) Applicant: CMP Automation Inc., Ayr (CA)

(72) Inventors: Henry D. Weinhardt, Cambridge (CA); A. Daniel Weinhardt, Cambridge (CA); Robert M. Shwery, Waterloo (CA)

(73) Assignee: CMP Automation Inc., Ayr (CA)

( * ) Notice: Subject to any disclaimer, the term of this patent is extended or adjusted under 35 U.S.C. 154(b) by 215 days.

(21) Appl. No.: 15/073,269

(22) Filed: Mar. 17, 2016

(65) Prior Publication Data

US 2016/0311149 A1    Oct. 27, 2016

Related U.S. Application Data

(60) Provisional application No. 62/151,669, filed on Apr. 23, 2015.

(51) Int. Cl.
*B29C 47/92* (2006.01)
*B29C 71/00* (2006.01)
*B29C 45/00* (2006.01)
*B29C 51/08* (2006.01)
*B29C 57/00* (2006.01)
(Continued)

(52) U.S. Cl.
CPC ............ *B29C 53/083* (2013.01); *B29C 53/84* (2013.01); *B29L 2023/004* (2013.01)

(58) Field of Classification Search
CPC ....... B29C 53/08; B29C 53/083; B29C 53/84; B29C 35/16; B29L 2023/004; B29L 2023/22

USPC .... 264/40.1, 40.6, 40.7, 232, 234, 237, 239, 264/294, 295, 299, 319, 320, 322, 339, 264/340, 345, 348, DIG. 66; 425/162, (Continued)

(56) References Cited

U.S. PATENT DOCUMENTS 4,061,005 A * 12/1977 Kawanami ............. B21D 7/025
                                                        72/128
5,422,048 A     6/1995 Kodama et al.
(Continued)

FOREIGN PATENT DOCUMENTS

EP      0715568         6/1999
GB      2390566 A *    1/2004  ........... B29C 53/083
JP      2548578 B2 *  10/1996  ........... B23C 53/083

*Primary Examiner* — Philip C Tucker
*Assistant Examiner* — Brian R Slawski
(74) *Attorney, Agent, or Firm* — Craig Armstrong; Merizzi Ramsbottom & Forster

(57) ABSTRACT

A plastic tube is bent by advancing the tube to position a desired first bend location of the tube at a bending/cooling station, the bend location of the tube having been previously heated by a tube heating assembly sufficiently for bending. The tube heating assembly is moved to a next desired bend location of the tube. Bending and cooling the tube at the first bend location, and heating the next desired bend location, take place in overlapping time windows, before advancing the tube to position the next desired bend location of the tube at the bending/cooling station. Total cycle time for heating, bending and cooling is thereby substantially reduced compared to carrying out heating, bending and cooling sequentially. The apparatus is controlled by PLC or PC-based programs, which effect movement via servomotors and also control other parameters such as heating and cooling times and temperatures.

11 Claims, 9 Drawing Sheets

(51) Int. Cl.
*B29C 53/00* (2006.01)
*B29C 55/00* (2006.01)
*B29C 53/08* (2006.01)
*B29C 53/84* (2006.01)
*B29L 23/00* (2006.01)

(58) Field of Classification Search
USPC .......... 425/383, 384, 392; 72/201, 202, 369; 285/41
See application file for complete search history.

(56) References Cited

U.S. PATENT DOCUMENTS

| | | |
|---|---|---|
| 5,504,308 A | 4/1996 | Shiozaki |
| 5,516,479 A | 5/1996 | Schimmelpfennig et al. |
| 6,309,588 B1 | 10/2001 | Powell et al. |
| 7,231,798 B2 * | 6/2007 | Zhang ...................... B21D 7/00 72/128 |

* cited by examiner

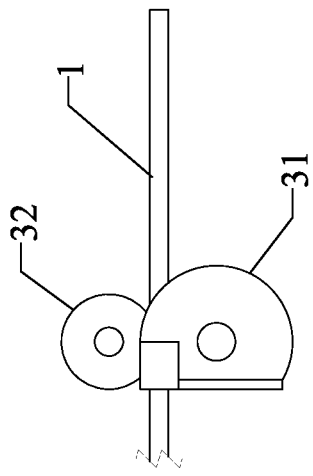
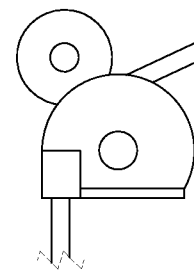
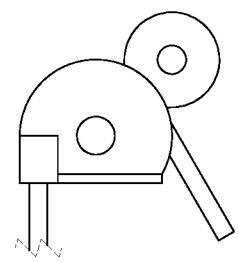
FIGURE 6a  FIGURE 6b  FIGURE 6c
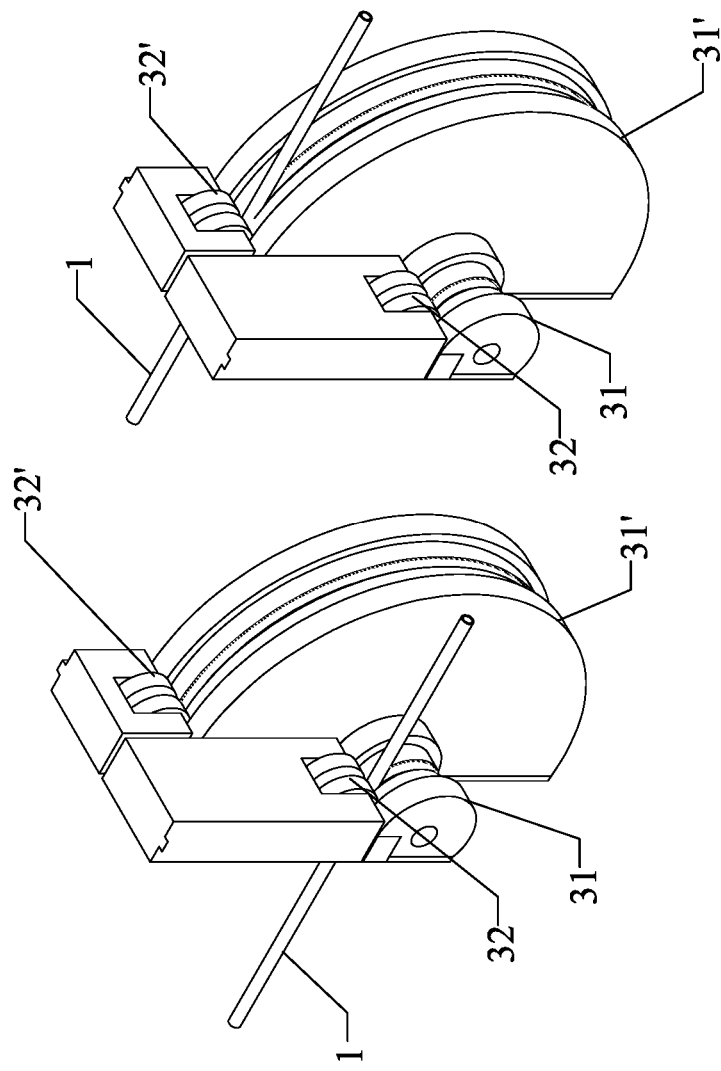
FIGURE 6d
FIGURE 6

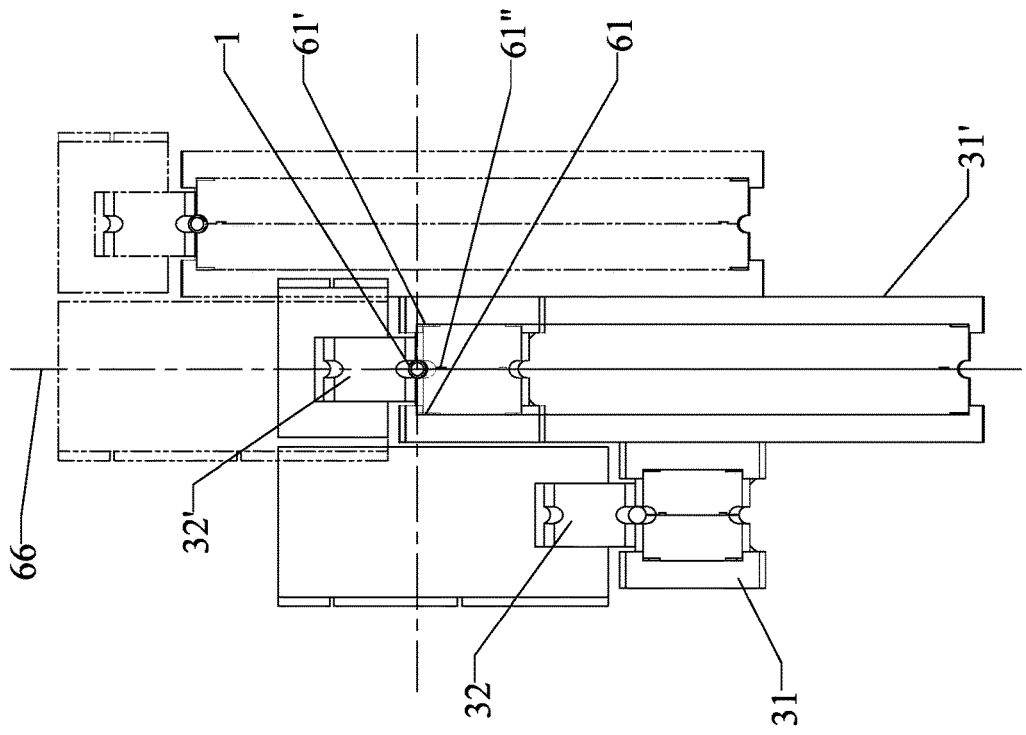
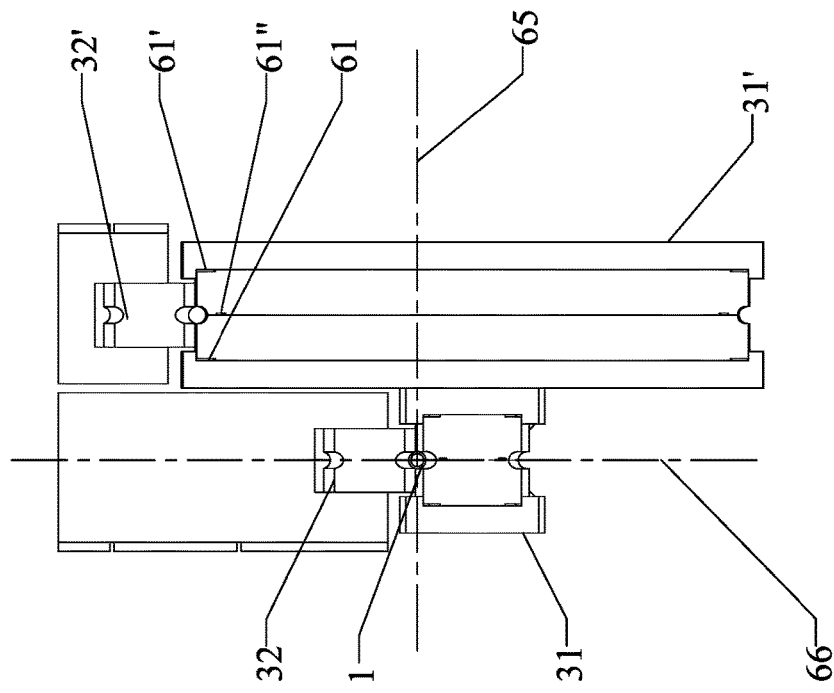

PLASTIC TUBE BENDING METHOD AND APPARATUS

BACKGROUND OF THE INVENTION

This invention relates to bending of plastic tubes, particularly nylon tubes but not necessarily limited to the same, and particularly as applied to automotive applications, appliances and other commercial or industrial applications, but not necessarily limited to the same.

Throughout this specification, for convenience, the term "nylon" may be used in referring to the plastic tube material. However, except where the context dictates otherwise, the expression is intended to include other plastic tube materials, including for example resin, polyamide or nylon-based materials.

Various plastic/nylon tubes are used to convey liquids and vapors in many applications, including automotive applications. These tubes are semi-rigid with very stable properties under various conditions of heat and light, and are therefore suitable for conveying liquids, including fuels and fuel vapors.

In these applications, so that the tube can be properly routed, it usually needs to be formed to a specific contour, i.e. with various bend radii, bend angles, bend rotations, and distances between bends. This forming process requires a staged sequence of heating, bending and cooling.

Many methods of forming plastic/nylon tubes using this sequence of heating, bending and cooling are currently in use. They generally use dedicated forming tools to produce one contour consisting of multiple bends of varying radii, bend angle, bend rotation, and distance between bends. The tube is heated using hot air or other means in its straight form, transferred into a steel forming tool or series of tools to bend the tube to the desired contour, cooled in place using cold air or water or other means, and removed having achieved the desired contour. Due to the dedicated nature of these bending methods, the tooling is expensive and generally not easily reconfigurable for different contours. Contour changes are very common, and are expensive and time consuming. This is disproportionately costly, especially for producing tubes in relatively low quantity. The dedicated tools and machines also require a large manufacturing space.

In view of the preceding, there is a need for a readily reconfigurable method of bending plastic/nylon tubes which is effective and efficient, and for apparatus to carry out the same.

In addition to being readily reconfigurable, the method and apparatus ideally would have a reasonably small footprint, and a short cycle time for each bend.

BRIEF SUMMARY OF THE INVENTION

Accordingly, in view of the above-described problems encountered in the prior art, a principal object of the present invention is to create a readily reconfigurable method and apparatus for bending plastic/nylon tubes. In the invention, a plastic tube is formed using the conventional method of a staged sequence of heating, bending and cooling. However the means by which this is accomplished is flexible to facilitate initial setup, as well as reconfiguration for different contours.

In the method of the invention, the plastic tube is bent by first advancing the tube to position a desired first bend location of the tube at a bending/cooling station, the bend location of the tube having been previously heated by a tube heating assembly sufficiently for bending. Then the tube heating assembly is moved to a next desired bend location of the tube. Bending and cooling of the tube at the first bend location, and heating at the next desired bend location, then take place with the time window for the bending and cooling overlapping with the time window for heating at the next bend location. The tube is then advanced to position said next desired bend location at the bending/cooling station, and is rotated if/as necessary for the desired next bend orientation. These steps are repeated until all desired bends have been completed. As a result of the overlapping time windows, the total cycle time for heating, bending and cooling is substantially reduced compared to carrying out heating, bending and cooling sequentially.

Preferred apparatus for carrying out the method of the invention has a base; a bending/cooling station mounted on the base, including means for bending and cooling the tube; a tube clamping assembly mounted on a track on the base, movable towards and away from the bending/cooling station, and including tube clamping fingers for gripping the plastic tube to advance it through the bending/cooling station, and a tube rotation assembly for rotating the tube; a tube heating assembly mounted on the track, between the bending/cooling station and the tube clamping assembly, including means for heating the tube; respective servomotors for moving the tube clamping assembly on the track, for moving the tube heating assembly on the track, for rotating the tube clamping fingers to rotate the tube, and for actuating a pivoting bending die at the bending/cooling station to bend the tube on a bend radius locate die; and programmable control means to monitor and control the servomotors and heating and cooling temperatures and times, including moving the tube heating assembly to a position to heat a next bend location while the tube is bent at a bend location.

In preferred embodiments, all bending functions of the machine (distance between bends, rotation between bends, and angle of bend) are accomplished using servomotors. The tube is held in its straight form, and is advanced through each heating, bending and cooling step in series until a final contour is complete.

Preferably, the bending/cooling station includes means to accommodate at least two different bend radii sizes, selectable through programmable means.

Preferably, to facilitate continuous feeding of tubing from a roll instead of in discreet lengths, a tube cutting system is also provided, to cut the tube to the desired length after its last bend is accomplished. However, if desired, pre-cut lengths can be used, and loaded manually or from a feeder.

Each individual bend contour requires a separate heating and cooling function in addition to bend tooling actuation. Tube contours with multiple bends require multiple forming sequences applied in series. Minimized time allotments for heating and cooling are particularly important and are addressed in this invention by having heating for one bend taking place at least partially contemporaneously with cooling of the previous bend, so that overall cycle time is minimized.

Various tube diameters and bend radii are expected to be accommodated at different times, and preferred embodiments of the invention ensure that the physical changeover of tooling is optimized for user simplicity.

Further details of the invention will be described or will become apparent in the course of the following detailed description and drawings of embodiments of the invention, being presented as examples only.

BRIEF DESCRIPTION OF THE DRAWINGS

Examples of the invention will now be described with reference to the accompanying drawings, in which:

FIGS. 2a and 2b are perspective views to illustrate how movement of the carriage of the tube indexing assembly causes displacement of the tube supports;

FIG. 3a is a perspective view showing the hot air delivery manifolds;

FIG. 6 is a perspective view showing the bending dies with the tube in position for a small-radius bend;

FIGS. 6a to 6c are side view showing the bending sequence;

FIG. 6d is a perspective view similar to FIG. 6, but showing the bending dies with the tube in position for a large-radius bend;

FIG. 7a is a cross-sectional view showing the cooling ducts, and the tube in position for a small-radius bend;

FIG. 7b is a cross-sectional view similar to FIG. 7a, but showing the bending/cooling assembly shifted to a position for a large-radius bend;

DETAILED DESCRIPTION OF THE INVENTION

Overview

Figure 1:
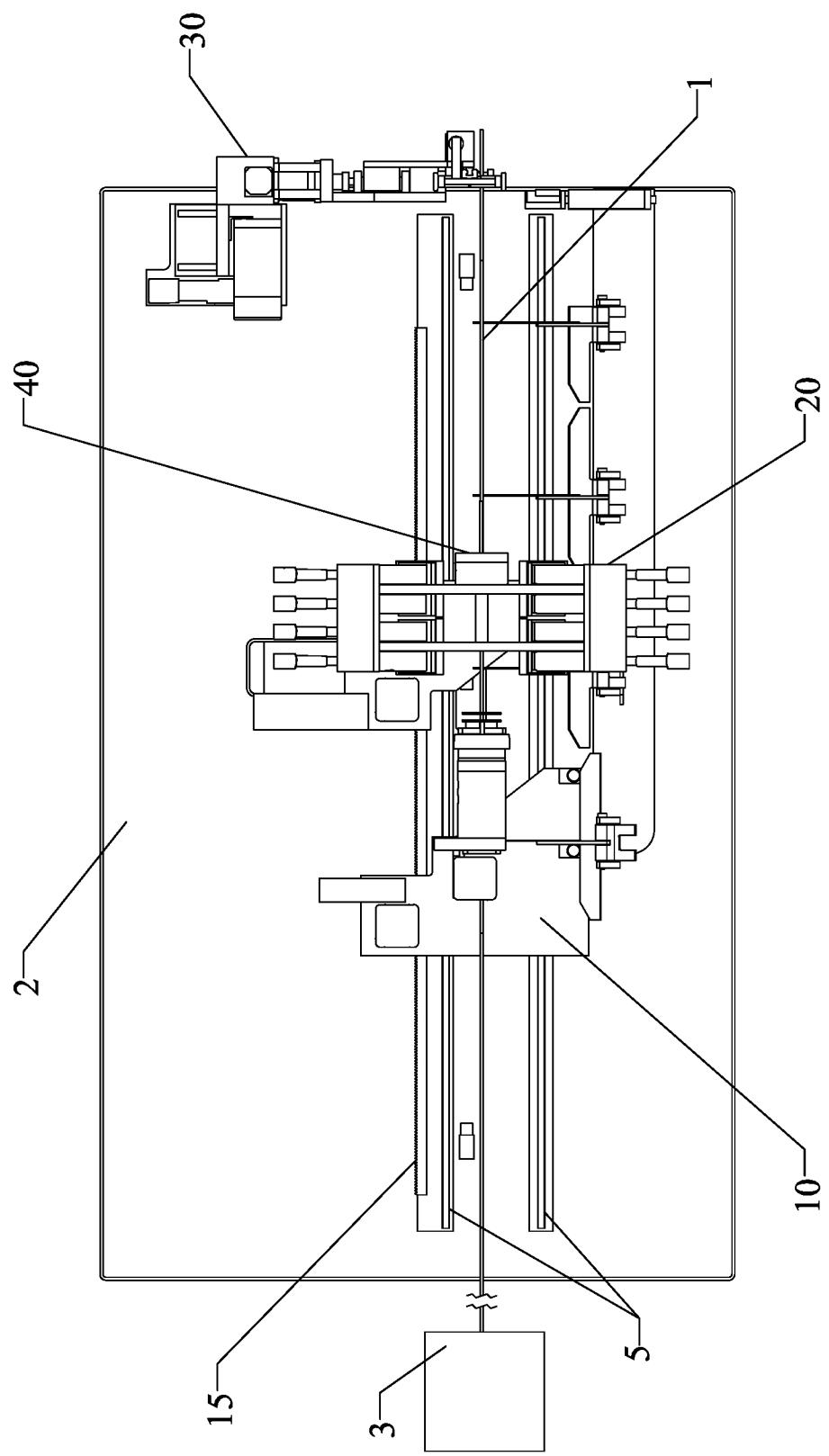
FIG. 1 is an overview of the apparatus in top view.

FIG. 1 shows a preferred example of the overall apparatus for bending the tube 1, which may be a pre-cut length, or which may be supplied from a roll 3 (shown only schematically). The apparatus includes a base 2, supporting a tube indexing assembly 10, a tube heating assembly 20, a tube bending/cooling assembly 30, and a tube cutting assembly 40. The tube indexing assembly 10, and the tube heating assembly 20 and tube cutting assembly 40, move along tracks 5.

Indexing

Figure 2:
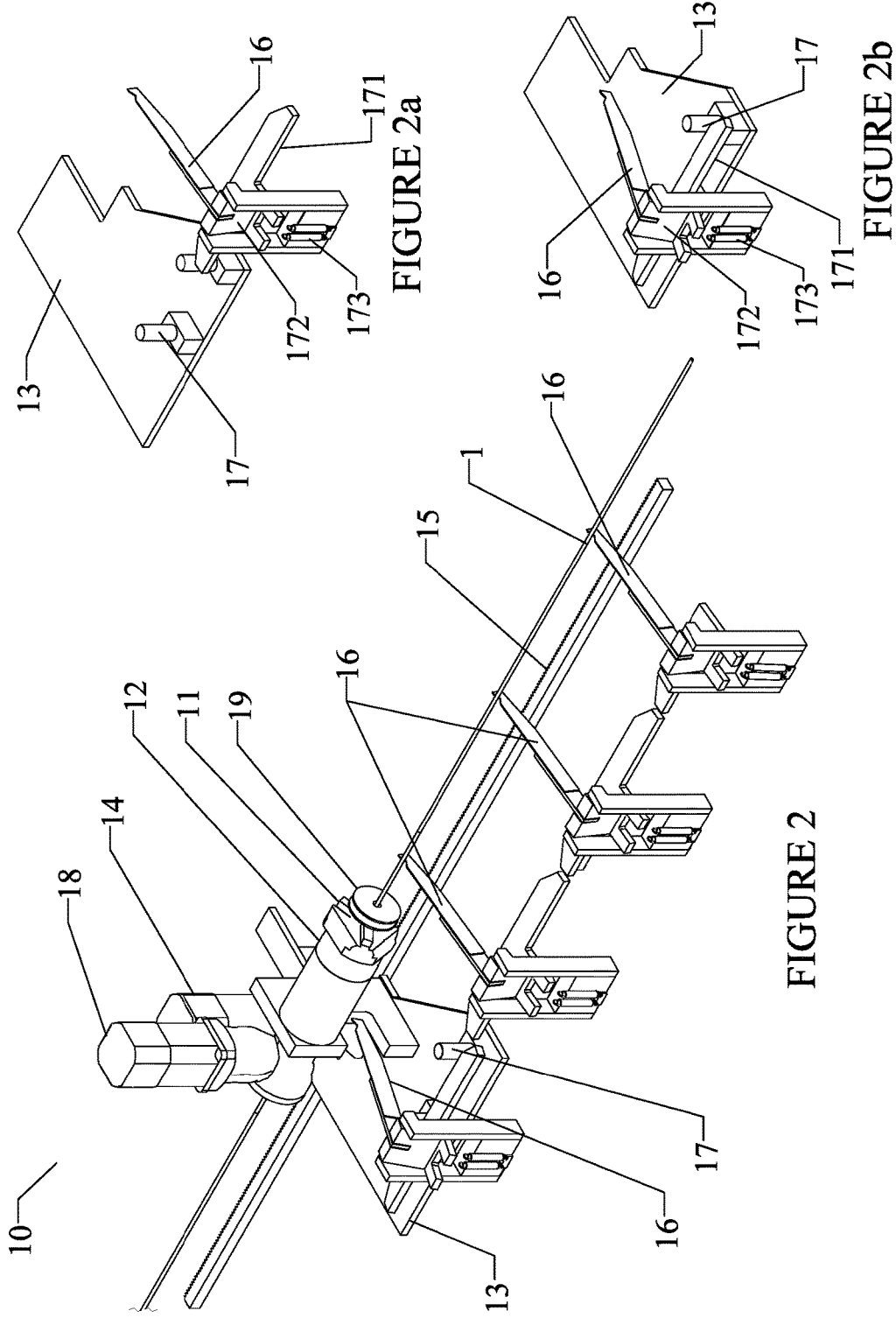
FIG. 2 is a perspective view of the tube indexing assembly.

FIG. 2 shows the tube indexing system 10. The tube 1 is clamped by tube clamping fingers 11 in a tube clamping assembly 12, rotatably mounted on a carriage 13. The tube clamping fingers are activated to grip the tube. The carriage 13 is advanced towards the bending/cooling station 30 by a tube advance servomotor 14, which drives a gear to move the carriage along a rack 15 mounted on one of the tracks 5. Thus controlling the tube advance servomotor 14 determines the longitudinal position of the tube at the bending/cooling station 30.

Long tubes require longitudinal support throughout the process, to allow the tube to remain in a horizontally linear profile for successful positioning in the bending/cooling station. As carriage 13 advances towards the bending/cooling station, a series of tube supports 16 are individually lowered out of position by cams 17 to allow the carriage to pass by. As seen best in FIGS. 2a and 2b, the cams 17 come into contact with bars 171 which are connected to respective pivot blocks 172, to rotate the tube supports downwardly against the upward bias of springs 173. The length of the bars corresponds to how long the tube support has to be held down away from the carriage.

The carriage 13 also carries a tube rotation servomotor 18, directly coupled to a hollow shaft gearbox which holds the tube clamping assembly 12. Thus the rotational orientation of the tube at the bending/cooling station 30 is controlled by the tube rotation servomotor 18, and the longitudinal position of the tube is controlled by the tube advance servomotor 14. The hollow configuration allows for long tubes (from straight or coil configurations) to be loaded from behind the tube clamping fingers 11, although in some embodiments pre-cut lengths could instead be loaded from the front.

The tube clamping assembly 12 has interchangeable tooling to accommodate various tube diameters and allow for quite simple manual changeover. Specifically, the disc 19, which has a central opening, may be switched out for a disc with a different diameter of opening, to accommodate a different diameter of tube. The disc does not have any particular operational function, other than to prevent the tube from dropping down between the clamping fingers 11 when they are opened.

Heating

Figure 3:
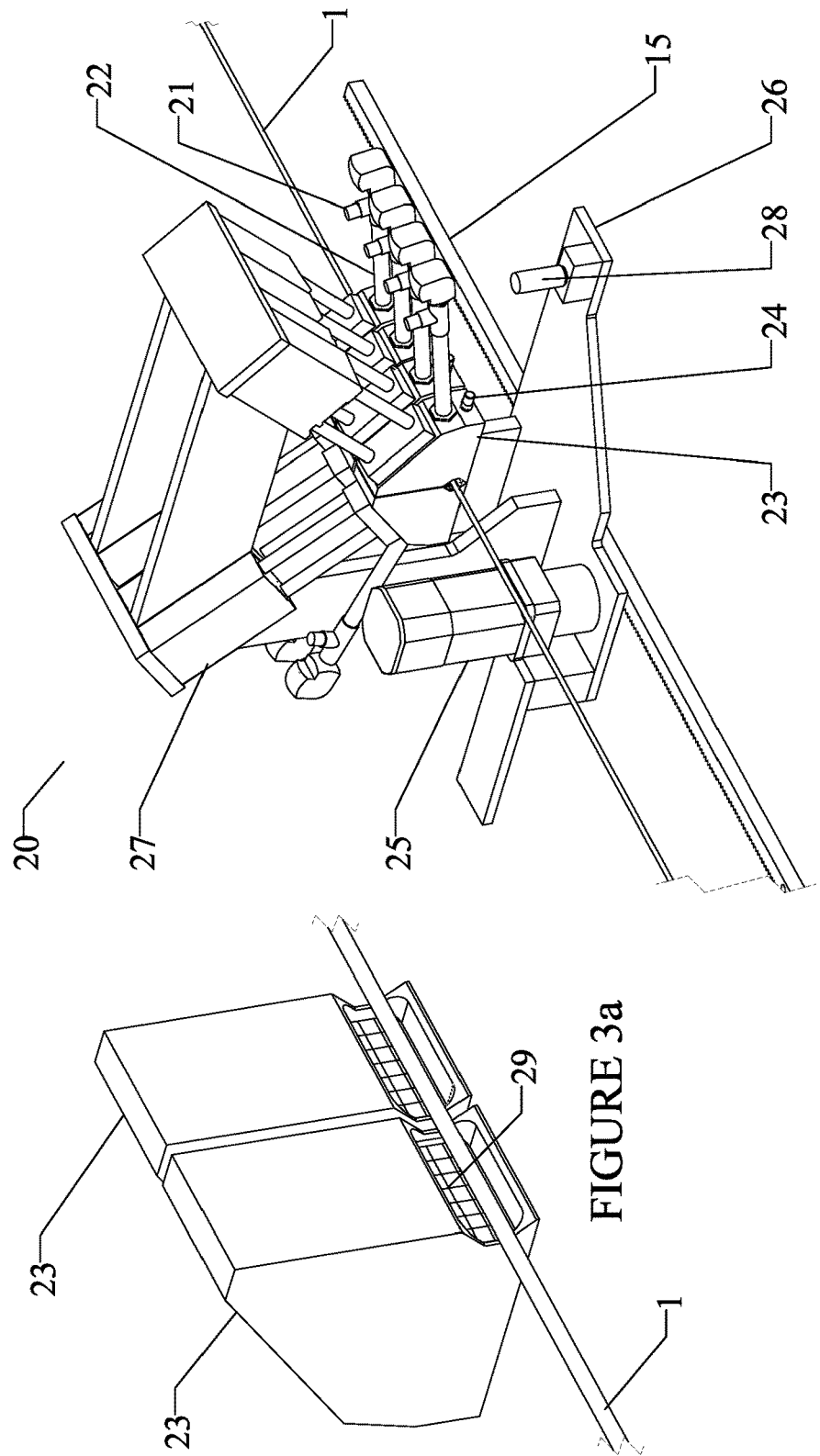
FIG. 3 is a perspective view of the tube heating assembly.

FIG. 3 shows the tube heating assembly 20, which is also controlled and driven along the rack 15 and the tracks 5. An important aspect of the invention is that controlling the position of the tube heating assembly allows the next bend location to be heated by the tube heating assembly 20 while the current location is being bent at the bending/cooling station 30. This parallel process greatly improves cycle time compared to having separate, sequential heating and cooling steps.

FIG. 3 illustrates the elements and functions of the tube heating assembly 20. Compressed air is supplied to air ports 21. The air passes over electric heating coils 22 and into hot air delivery manifolds 23 on either side of the tube so that the hot air completely envelops the tube. FIG. 3a shows two of the manifolds in the heating position, with the others removed for clarity. Hot air exits the manifolds through exit holes 29. A thermocouple 24 is mounted to monitor and allow for the control of the actual air temperature at its application point. When the tube 1 is advanced to the current bend position, the heater positioning servomotor 25 drives a gear to move the tube heating assembly carriage 26 to the location on the tube where the next bend will be. Multiple manifolds 23 are provided, so as to accommodate varying bend radii specifications. For example, a large bend radius will require a longer area of the tube to be heated than for a tight bend. The manifold advance and retract cylinders 27 (one per manifold) are actuated to advance one or more manifolds, depending on the bend requirements, and the hot air brings the tube temperature to an ideal state for forming. Retraction of the manifolds also allows heating time to be controlled, which is highly desirable for optimizing tube forming temperature.

This heating process using hot air directed through multiple and independently actuated manifolds with thermocouple feedback, is highly advantageous in terms of producing a stable manufacturing method. The manifold advance and retract cylinders 27 provide a means to apply and remove heat for the correct time necessary to reach the desired forming temperature. As carriage 26 advances towards the bending/cooling station, a series of tube supports are individually lowered out of position by cam 28 to allow the carriage to pass by, as with the carriage of the tube indexing system 10.

For optimal bending, the nylon tube should be heated to a temperature in the range of about 180-240 Celsius. In this example of the invention, this heating is accomplished using a steady stream of hot air heated to about 250 Celsius. This heats the tube to the desired temperature range in approximately 10 seconds. Obviously the invention is not limited to this particular hot air temperature and heating time. Optimum temperatures and heating times are determined on a case-by-case basis for any given tube characteristics, through routine experimentation.

Bending

Figure 4:
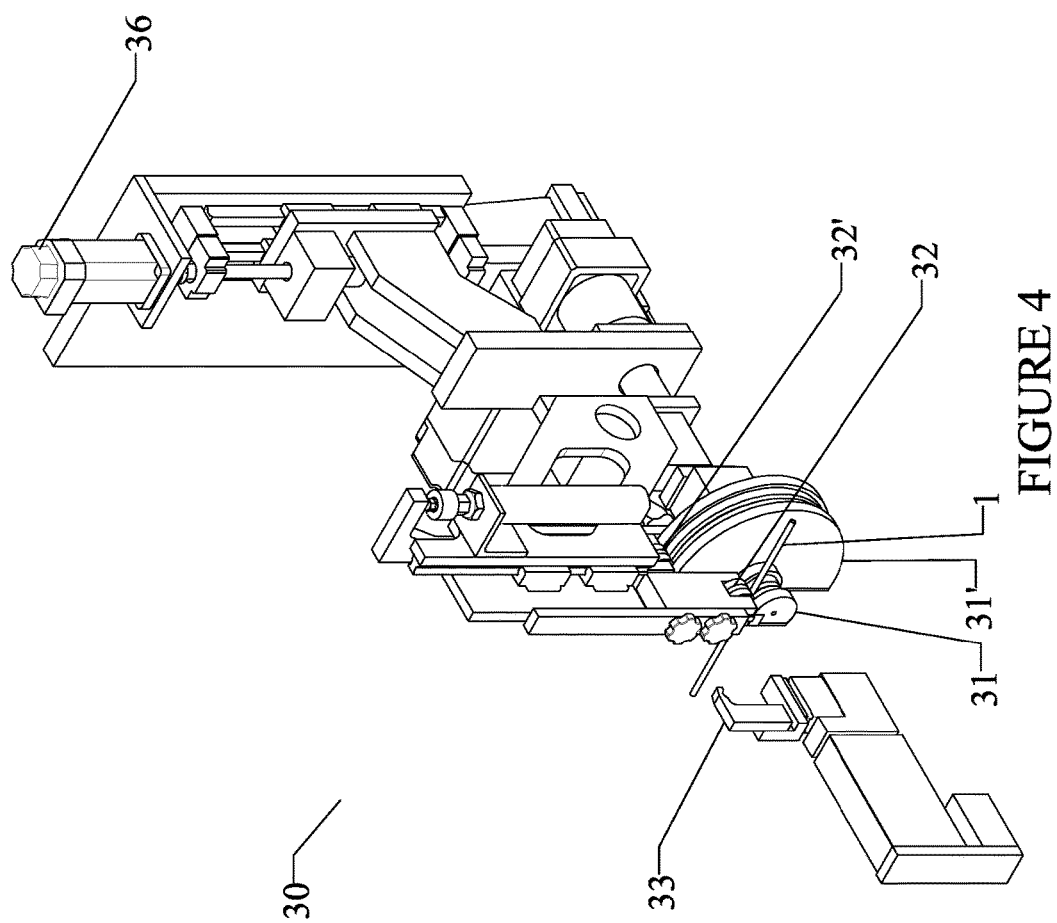
FIG. 4 is a front perspective view of the tube bending/cooling assembly.
Figure 5:
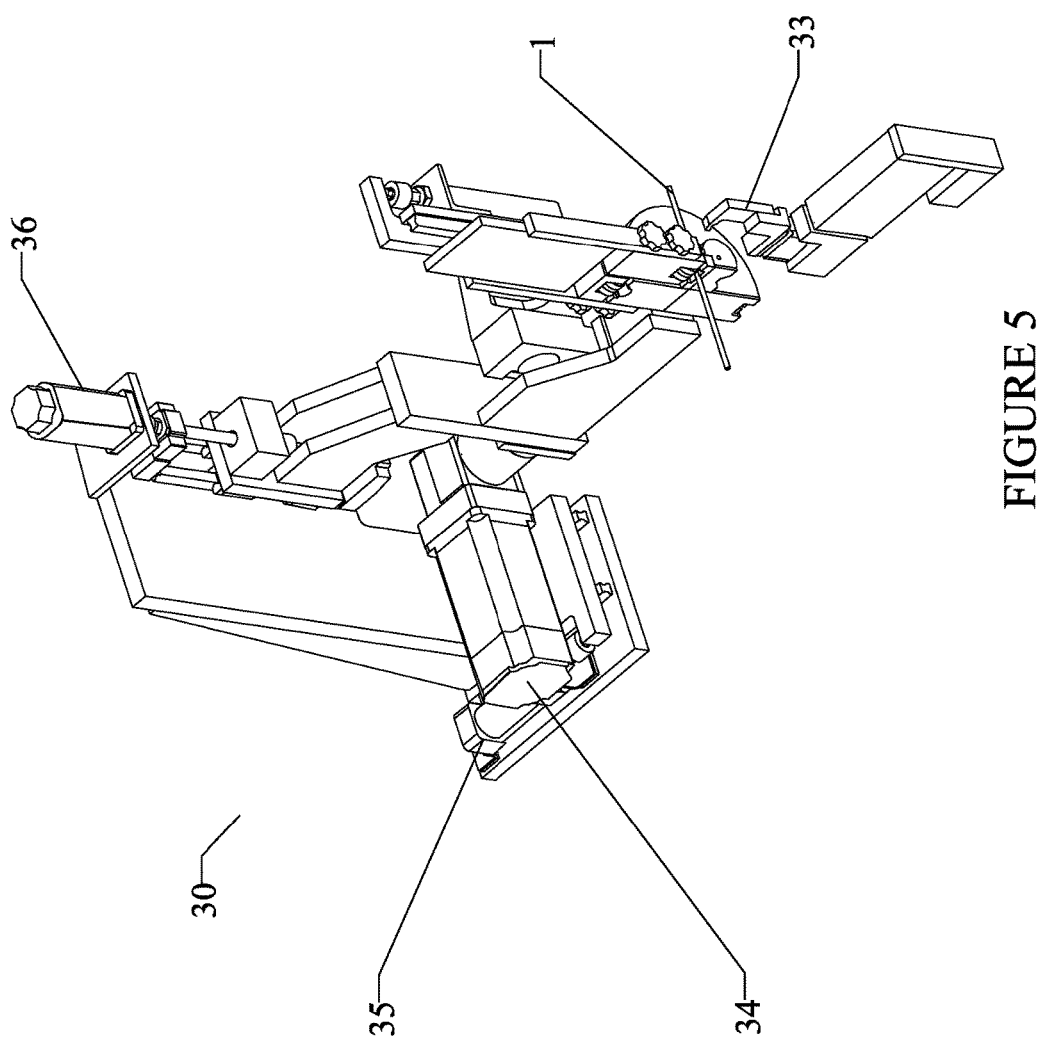
FIG. 5 is a rear perspective view of the tube bending/cooling assembly.

FIGS. 4 and 5 show the bending/cooling station 30. The station includes a dual set of bend radius locate dies, namely a small-radius die 31 and a larger-radius die 31', a corresponding dual set of pivoting bending dies 32 and 32', tube hold-down tooling 33 which is pneumatically actuated to move horizontally and vertically into a position to hold the tube straight during bending, and a bend actuation servomotor 34 which is connected to pivot the bending dies. The hold-down tooling is to counteract the tube wanting to lift just ahead of the bend radius locate dies as the bending dies are forming the desired bend.

The bend radius locate dies 32 and 32' also serve as the cooling application tools, as described later below.

Both the bend radius locate dies 31 and 31' and pivoting bending dies 32 and 32' are interchangeable to accommodate various tube diameters and bend radii and allow for manual changeover.

FIGS. 6 to 6d further illustrate the tooling that applies each bend to the pre-heated tube 1. FIGS. 6a to 6c in particular show the bending sequence. The pivoting bending die 32 moves along an arc relative to the bend radius locate die 31. The pivoting bending die 32 is mounted so as to rotate freely on its axis, to prevent possible damage to the preheated tube. The pivoting bending die 32 produces the desired amount of bend angle at each bend. This function being actuated by a servomotor, i.e. by the bend actuation servomotor 34, is an important aspect of the invention. This is because relaxation of the bend angle of the tube after bending is a known factor in bending plastic/nylon tube. In this invention the bend angle can be adjusted by controlling the bend actuation servomotor 34, to accommodate relaxation in the bent tube angle. The pre-heat temperature parameter also affects bend angle relaxation; a tube that is heated to the correct forming temperature will require less over-bending to compensate for relaxation. When a specific tube part is programmed to produce a final tube contour these two parameters, temperature and servomotor bend angle, are adjusted through routine experimentation, until a final stable and reproducible result is achieved. Being able to control the bend actuation via a servomotor greatly facilitates this routine experimentation, making it much easier to optimize production of a new part quickly.

FIGS. 7a and 7b best show the side shift feature and vertical adjustment feature that allows the dual set of bend dies to alternate position, allowing greater flexibility for tubes that require two different bend radii. This is accomplished by air cylinder 35 that moves the dies horizontally and a servomotor 36 that moves the dies vertically into position, presenting the tube 1 for bending. FIG. 7b in particular shows the two positions clearly.

Cooling

FIGS. 7a and 7b show the plastic/nylon tube cooling application points. Compressed air, that is chilled, is passed through ducts in the bend radius locate dies 31 and 31'. Each bend radius locate die provides three cooling ducts 61, 61' and 61" (left, right and bottom respectively) where chilled air exits along the die where the bent tube lies. This creates a complete envelope of chilled air around the tube 1. The temperature of the chilled air and its thorough application to the outside of the tube are important factors in how much time is required for the process of establishing the plastic/nylon tube in its bent position, and in obtaining a stable process with minimal cooling time. Shorter cooling times make manufacturing of higher quantity of tubes more viable.

The tube is cooled before advancing it from the bending/cooling station 30. In this example of the invention, this is accomplished using a steady stream of air cooled to about −25 Celsius. or lower. This cools the tube sufficiently in approximately 10 seconds. Obviously the invention is not limited to this particular cooling air temperature and cooling time. As with heating the tube, optimum cooling temperatures and times are determined on a case-by-case basis for any given tube characteristics, through routine experimentation.

The bending/cooling station preferably also includes thermocouple feedback, to aid in producing a stable manufacturing method.

Notwithstanding the preceding, it must again be emphasized that the temperatures stated above, for both heating and cooling, are just examples which have been determined from initial testing only. Routine experimentation may determine narrower or wider preferred ranges of temperatures, and optimum temperatures or temperature ranges will vary according to the application and specific tube characteristics. Similarly, heating and cooling times may vary, with optimums to be determined according to routine experimentation.

Cutting

Figure 8:
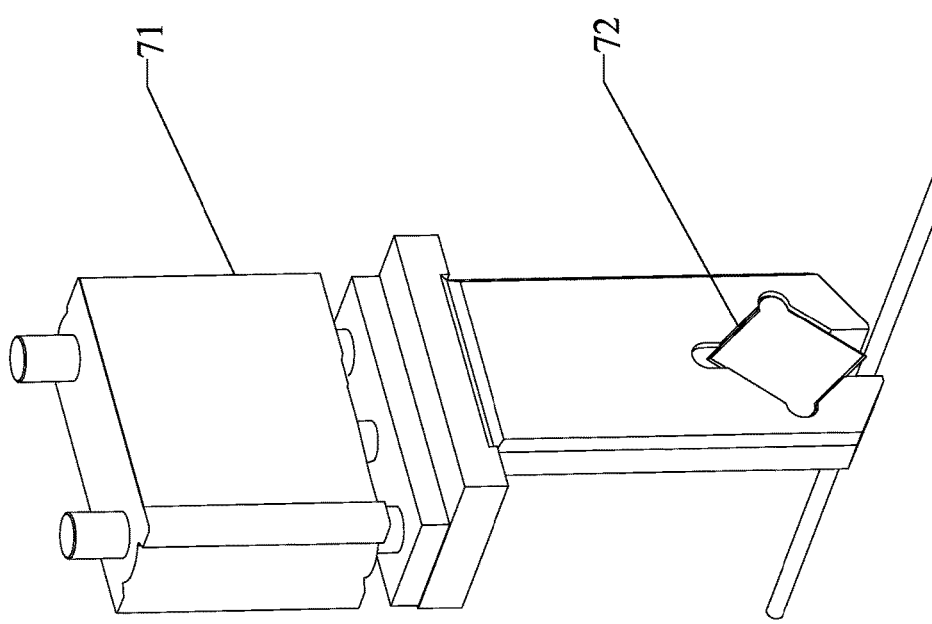
FIG. 8 is a perspective view of the tube cutting assembly.

FIG. 8 shows the tube cutting assembly 40, described in greater detail below. An important advantage of the preferred embodiment of the invention is that long tubes (from straight or coil configurations) can be cut to length as part of the bending process with minimal operator involvement. As will be described later below, tubes pre-cut to the correct length can be loaded manually, automatically or semi-automatically, but incorporating a tube cutting system such as this one avoids that need and renders the process more efficient.

The tube cutting system 40 is mounted to the tube heating assembly 20 which allows for programmable positioning along the length of the tube by way of the heater positioning servomotor 25 that drives a gear to move the tube heating assembly carriage 26 to the location on the tube where the next cut will be. The cutter is driven downward over the tube by air cylinder 71, causing the knife blade 72 to sever the tube.

Simultaneous Heating/Cooling and Other Advantages

It is a specific advantage of the invention that because heating of the next bend location starts while the previous bend is being cooled, i.e. in overlapping time windows (as close to simultaneous as possible), the heating and cooling times are not additive. An overall cycle time in the range of approximately 10 to 15 seconds per bend is presently expected from the preferred embodiment, and may be reduced below that range with further routine experimental optimization of parameters. This reduction in cycle time obviously is especially important for higher volume manufacturing requirements.

Central to optimal forming of nylon tubing by this invention is the ability to control the time that heating and cooling apparatus is applied to the tube, as well as other parameters such a heating and cooling air temperatures. The invention allows for optimally setting these parameters on a per bend basis and refining these parameters to achieve accurate and repeatable results.

It is known that relaxation of nylon materials may occur at the time of bending and within 12-24 hours thereafter, due to the nature of these nylon materials. The invention allows for complete adjustability for bend position, angle and rotation using servomotors to compensate for anticipated or demonstrated relaxation of bend angle or rotation correction.

An important feature of the invention and its stated purpose of flexibility (i.e. being readily reconfigurable) is the use of programmable control means, e.g. programmable logic controller (PLC) or PC-based programs, to provide key advantages at multiple stages. Firstly, various parameters (including heating air temperature, heating time, cooling air temperature, cooling time, bend angle for each bend, rotation between bends, index distance between bends, and cutting position) can be entered into the system during the development of a set of parameters for a particular tube contour. The process involves a sequence of setting these parameters and then testing and resetting them via routine experimentation until the desired end product result is achieved. Secondly, during manufacturing, the parameters may need adjustment from time to time to deal with ambient conditions and material variations which are common in manufacturing settings. Thirdly, change of contour requirements in automotive and other commercial and industrial settings is common. With dedicated equipment, making these changes is a costly undertaking, both in material and labor costs, plus involves time-consuming down time. With this invention, through revision of parameters in the algorithms for a particular tube contour, changes can made quickly and with little or no additional tooling cost. Furthermore, because the PLC can store multiple "recipes", i.e. parameter sets for given part numbers based on previous production, it is easy to switch from producing one part to producing another part, with no need to repeat the routine experimentation to re-establish the optimum parameters.

Alternative Embodiments

As an alternative to continuous feeding of the tube and using a tube cutting system to cut the tubes within the system, tubes pre-cut to the correct length can be loaded manually, automatically or semi-automatically.

In such an alternative, pre-cut tubes are presented, preferably by an automated loading system, to the front of the tube clamp fingers 11. The automated loading system will accommodate various lengths and diameters of tube by storing them in varying quantities and subsequently dispensing individual tubes into the bending apparatus on demand.

In many applications, the completed parts will simply be allowed to fall into a bin once completed. However, if desired, the system can also be provided with an unloading system to transfer completed parts from the system to bins, racks, conveyors or the like, for example by using a telescoping arm with a gripping mechanism to grip the part just prior to cutting via the tube cutting assembly, and then transfer it to the desired location.

As an alternative source of heat, a central source can be included in the apparatus to eliminate the multiple electric heating coils 22. This centralized source of heat would convey hot air to the hot air delivery ducts 23 by way of a series of pneumatic valves controlled by the PLC.

Other alternative methods of heating the tube could be incorporated into the apparatus, such as including an ultrasonic tooling source that would replace the hot air delivery manifolds 23 on either side of the tube. High frequency induction or radiant heat could also be used.

Alternative cooling means could also be employed. Alternative chilled air sources may include, but are not limited to, vortex air chillers, thermo-electric air conditioners, compressor based air conditioners and the like.

EXAMPLE

Figure 9:
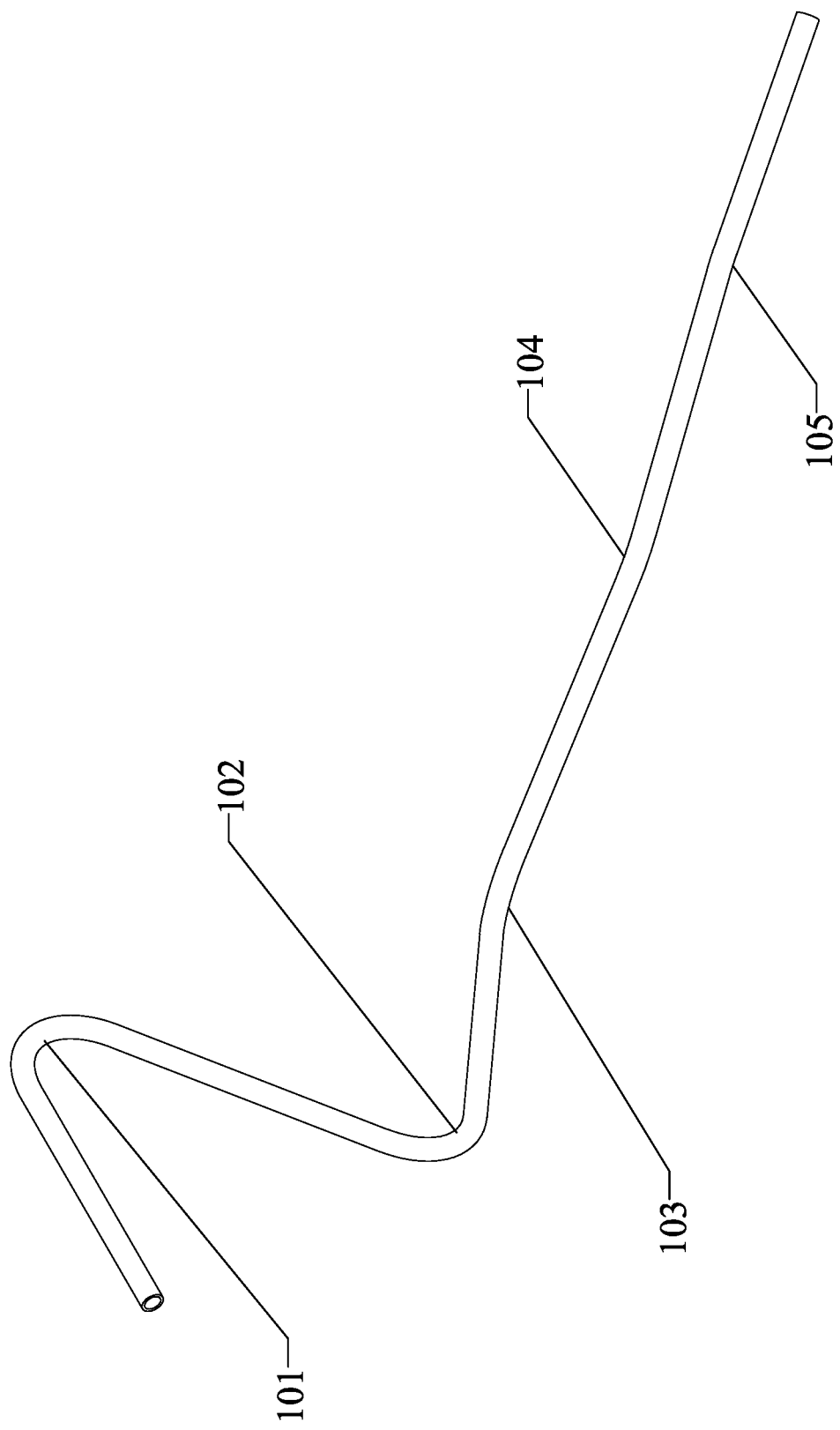
FIG. 9 is a perspective view of an example of a nylon tube produced by the method and apparatus.

As an example, FIG. 9 shows a nylon tube that was produced on a prototype of the preferred embodiment of the invention. It has five bends 101 to 105, each bend processed as described herein.

The plastic tube, made of a nylon material known as PA-12, having an outside diameter of 8 mm and an inside diameter of 6 mm, was bent by applying air heated to 230° C. for 6 to 8 seconds. The tube was cooled, in parallel with heating, by applying air at −25° C. for 6 to 8 seconds. Including time for tube indexing and bend activation, the overall cycle time to produce the bent part was 60 seconds. The specified bend radius was 32.0 mm.

Additional Variations

It will be evident to those knowledgeable in the field of the invention that many variations on the examples described above are conceivable within the scope of the invention. It should therefore be understood that the claims which define the invention are not restricted to the specific examples described above.

Further variations may be apparent or become apparent to those knowledgeable in the field of the invention, within the scope of the invention as defined by the claims which follow.

The invention claimed is:
1. A method of bending a plastic tube, comprising the steps of:
   a. advancing the tube to position a desired first bend location of the tube at a bending/cooling station, the bend location of the tube having been previously heated by a tube heating assembly sufficiently for bending;
   b. moving said tube heating assembly to a next desired bend location of the tube;
   c. bending and cooling the tube at the first bend location, and heating said next desired bend location with said tube heating assembly sufficiently for bending, such that a time window for said bending and cooling at said first bend location overlaps with a time window for heating at said next bend location;
   d. advancing the tube to position said next desired bend location of the tube at said bending/cooling station, and rotating the tube if/as necessary for the desired next bend orientation; and
   e. repeating steps b., c. and d. until all desired bends have been completed;
   whereby total cycle time for heating, bending and cooling is substantially reduced compared to carrying out heating, bending and cooling sequentially.

2. The method of claim 1, where said cooling of the tube at said bending/cooling station is by application of chilled air applied so as to envelop the tube in said bending/cooling station.

3. The method of claim 1, where said heating of the tube by said tube heating assembly is by application of heated air applied so as to envelop the tube in said tube heating assembly.

4. The method of claim 3, wherein the heated air is supplied to said tube heating assembly by selectable manifolds such that heated air may be applied to varying lengths of tube by selecting which manifolds are used to supply the heated air.

5. The method of claim 1, where said cooling of the tube at said bending/cooling station is by application of chilled air applied so as to envelop the tube in said bending/cooling station, and where said heating of the tube by said tube heating assembly is by application of heated air applied so as to envelop the tube in said tube heating assembly.

6. The method of claim 5, wherein the heated air is supplied to said tube heating assembly by selectable manifolds such that heated air may be applied to varying lengths of tube by selecting which manifolds are used to supply the heated air.

7. The method of claim 6, where heating time, cooling time, bend angle for each bend, tube rotation between bends, and distance between bends are controlled by programmable control means.

8. The method of claim 5, where heating time, cooling time, bend angle for each bend, tube rotation between bends, and distance between bends are controlled by programmable control means.

9. The method of claim 8, where the temperatures of said chilled air and of said heated air are monitored by thermocouples and are controlled by programmable control means.

10. The method of claim 1, where heating time, cooling time, bend angle for each bend, tube rotation between bends, and distance between bends are controlled by programmable control means.

11. The method of claim 1, where at least advancing said tube, rotating said tube, moving said heating assembly, and bending said tube, are carried out by operation of servomotors controlled by programmable control means.

* * * * *